United States Patent
Bram (10) Patent No.: US 11,384,233 B2
(45) Date of Patent: Jul. 12, 2022

(54) POLYOLEFIN BLEND COMPOSITIONS

(71) Applicant: Lauren P. Bram, Houston, TX (US)

(72) Inventor: Lauren P. Bram, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 89 days.

(21) Appl. No.: 16/407,606

(22) Filed: May 9, 2019

(65) Prior Publication Data

US 2020/0354555 A1 Nov. 12, 2020

(51) Int. Cl.
| | |
|---|---|
| *C08L 23/16* | (2006.01) |
| *C08L 23/14* | (2006.01) |
| *C08L 23/08* | (2006.01) |
| *C08L 23/12* | (2006.01) |

(52) U.S. Cl.
CPC .......... *C08L 23/16* (2013.01); *C08L 23/0815* (2013.01); *C08L 23/12* (2013.01); *C08L 23/142* (2013.01); *C08L 2205/025* (2013.01); *C08L 2207/12* (2013.01)

(58) Field of Classification Search
CPC ...... C08L 23/16; C08L 23/0815; C08L 23/12; C08L 23/142; C08L 2205/025; C08L 2207/12
See application file for complete search history.

(56) References Cited

U.S. PATENT DOCUMENTS

| | | |
|---|---|---|
| 9,745,395 B2 | 8/2017 | Meka et al. |
| 2006/0254427 A1 | 11/2006 | Trend et al. |
| 2008/0032148 A1* | 2/2008 | Lee ........................ C09J 123/06 525/70 |
| 2008/0233234 A1 | 9/2008 | Shen et al. |
| 2009/0229732 A1 | 9/2009 | Determan et al. |
| 2015/0018788 A1 | 1/2015 | Pham et al. |
| 2017/0044359 A1* | 2/2017 | Kahlen et al. .......... C08L 23/06 |
| 2017/0137617 A1 | 5/2017 | Wang et al. |
| 2017/0284017 A1* | 10/2017 | Petra et al. ............ D06N 3/045 |
| 2018/0001604 A1* | 1/2018 | Van Loon et al. .. B29C 49/0042 |
| 2018/0162971 A1 | 6/2018 | Chen et al. |
| 2018/0215846 A1 | 8/2018 | Kulshreshtha et al. |

FOREIGN PATENT DOCUMENTS

| | | |
|---|---|---|
| EP | 0739944 A1 | 10/1996 |
| WO | 2015/057423 A | 4/2015 |

* cited by examiner

*Primary Examiner* — Irina S Zemel (57) ABSTRACT

The present disclosure relates to polypropylene-based and polyethylene-based polyolefin compositions having improved impact properties. In at least one embodiment, a polyolefin composition includes an ethylene polymer, a propylene polymer, a propylene-based elastomer, and an ethylene-based plastomer. Compositions of the present disclosure can have one or more of: a Notched Charpy impact strength at 23° C. of 8 kJ/m² or greater, a Notched Izod Impact Strength at 23° C. of 6 ft-lb/in. or greater, an Unnotched Izod impact strength at 23° C. of 10 ft-lb/in. or greater, and a portion of the composition having a submicron domain content of 50% or greater per mm².

35 Claims, 2 Drawing Sheets

POLYOLEFIN BLEND COMPOSITIONS

CROSS-REFERENCE TO RELATED APPLICATIONS

This application claims priority to U.S. Ser. No. 62/684,219, filed Jun. 13, 2018, herein incorporated by reference.

FIELD

The present disclosure relates to polypropylene-based and polyethylene-based polyolefin compositions having improved impact properties.

BACKGROUND

The supply chain in post-consumer recycle (PCR) products is quite complex and includes several parties which may collect, separate, de-label, grind, wash, re-separate, compound and finally sell to a customer who will fabricate the plastic part. It is common to see greater than 10% of polypropylene (PP) material mixed into a high density polyethylene (HDPE) post-consumer recycle base material. However, the immiscibility tendencies of HDPE and PP create a blend with limited properties. Indeed, the post-consumer recycle rigid high-density polyethylene (HDPE) and polypropylene (PP) industry struggles to balance and maintain needed physical properties, such as impact resistance, of the recycled material. For example, the lack of effective processes to separate PP and HDPE from one another results in a high concentration of one polyolefinic contamination within the other polyolefin. Furthermore, impact modifiers or compatibilizers are typically added to increase properties specified by the industry. It is not uncommon to see anywhere from one to ten different modifiers added to the final product before being sold to the fabricator. Once the customer is ready to fabricate the plastic part, they also may add extra modifiers as needed. However, modifiers typically increase one property of the material (like impact resistance), and do so only slightly (e.g., by 1 kJ/m$^2$ at room temperature). Furthermore, most modifiers also reduce one or more desirable material properties (such as flow modification).

There is a need for compositions and methods that can provide compositions having enhanced composition properties such as flow modification and impact properties.

SUMMARY

The present disclosure relates to polypropylene-based and polyethylene-based polyolefin compositions having improved impact properties. In at least one embodiment, a polyolefin composition includes an ethylene polymer, a propylene polymer, a propylene-based elastomer, and an ethylene-based plastomer. Compositions of the present disclosure can have one or more of: a Notched Charpy impact strength at 23° C. of 8 kJ/m$^2$ or greater, a Notched Izod Impact Strength at 23° C. of 0.6 ft-lb/in. or greater, and a portion of the composition having a submicron domain content of 50% or greater per mm$^2$.

DETAILED DESCRIPTION

Before the present compounds, components, compositions, and/or methods are disclosed and described, it is to be understood that unless otherwise indicated the present disclosure is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

The present disclosure relates to polypropylene-based and polyethylene-based polyolefin compositions having improved impact properties. The present disclosure provides a composition (blend) comprising one or more polyethylene, one or more polypropylene, one or more propylene-based elastomer, and one or more ethylene-based plastomer. In some embodiments, compositions and methods described herein relate to recycled polyolefin resins improvement using the polyolefin elastomers such as VISTAMAXX™ (from ExxonMobil Chemical Company) and ENGAGE™ (from Dow Chemical Company), and processes of forming such. In at least one embodiment, through the addition of a low level of one or more polyolefin elastomers such as VISTAMAXX™ into the polymer blend, final end properties such as flow modification and impact can be enhanced for both polypropylene and polyethylene-rich post-consumer recycle materials. In an HDPE-rich material, the VISTAMAXX™ can surround polypropylene domains to help increase physical properties. For example, the unique blend that includes, for example, VISTAMAXX™ and ENGAGE™ (50/50) polymers, can modify an HDPE-rich post-consumer recycle material, which can provide increased impact strength to the composition. In an HDPE-rich post-consumer recycle material, the blend that includes VISTAMAXX™ and ENGAGE™ polymers has a synergistic behavior in which polypropylene domains are noticeably smaller and rounder. These domains instead act as more of an impact-modifier, as opposed to contamination.

As used herein, a "composition" can include the components (such as a polyethylene, a polypropylene, a propylene-based elastomer, and/or an ethylene-based plastomer) as well as contact products of the components and/or reaction products of the components.

For the purposes of the present disclosure, ethylene shall be considered an α-olefin.

An "olefin", alternatively referred to as "alkene", is a linear, branched, or cyclic compound of carbon and hydrogen having at least one double bond. For the purposes of the present disclosure, ethylene shall be considered an alpha-olefin. An "alkene" group is a linear, branched, or cyclic radical of carbon and hydrogen having at least one double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units.

As used herein, "polymer" may refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," and "ethylene-based polymer" mean a polymer or copolymer comprising at least 50 mol % ethylene units (such as at least 70 mol % ethylene units, such as at least 80 mol % ethylene units, such as at least 90 mol % ethylene units, such as at least 95 mol % ethylene units or 100 mol % ethylene units (in the case of a homopolymer)).

As used herein, the term "homopolymer" is a polymer having mer units that are the same. The term "copolymer" means a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

As used herein, when a polymer is referred to as comprising a monomer, the monomer is present in the polymer in the polymerized form of the monomer or in the derivative form of the monomer. When a polymer is said to comprise a certain percentage, wt %, of a monomer, that percentage of monomer is based on the total amount of monomer units in the polymer.

For purposes of this disclosure, an ethylene polymer having a density of 0.910 to 0.940 g/cm$^3$ is referred to as a "low density polyethylene" (LDPE); an ethylene polymer having a density of 0.890 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors. "Linear" means that the polyethylene has no or only a few long-chain branches, typically referred to as a g'vis of 0.97 or above. An ethylene polymer having a density of more than 0.940 g/cm$^3$ is referred to as a "high density polyethylene" (HDPE).

As used herein, "elastomer" or "elastomer composition" refers to any polymer or composition of polymers (such as blends of polymers) consistent with the ASTM D1566 definition. Elastomer includes mixed blends of polymers such as melt mixing and/or reactor blends of polymers.

As used herein, a "plastomer" means ethylene-based copolymers having a density in the range of about 0.85 to 0.915 g/cm$^3$ ASTM D 4703 Method B and ASTM D1505. Plastomers in the compositions described herein can exhibit a MFR of from about 0.5 g/10 min to about 30 g/10 min. Plastomers in the compositions can include copolymers of ethylene derived units and higher α-olefin derived units such as propylene, 1-butene, 1-hexene, and 1-octene.

As used herein, "first" polymer and "second" polymer are merely identifiers used for convenience, and shall not be construed as limitation on individual ethylene copolymer, their relative order, or the number of ethylene copolymers used, unless otherwise specified herein.

First Polymer: Polyethylene

Polyethylenes include polyethylene homopolymers and ethylene-alpha-olefin copolymers. The ethylene-alpha-olefin copolymers have an alpha-olefin comonomer(s) content greater than 5 wt %, such as greater than 10 wt %, based on the total weight of polymerizable monomers. The amount of comonomer(s) incorporation can be greater than 15 wt %, such as greater than 20 wt %, such as greater than 25 wt %, such as greater than 30 wt %, such as greater than 35 wt %, such as greater than 40 wt %, such as greater than 45 wt %, such as greater than 50 wt %, based on the total weight of polymerizable monomers.

Comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In at least one embodiment, a comonomer is selected from propylene, butene, pentene, hexene, heptene, octene, nonene, decene, undecene, dodecene and isomers thereof. In at least one embodiment, a comonomer includes one or more $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_3$ to $C_{40}$ olefin comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

Exemplary comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically, the ethylene is copolymerized with one $C_3$-$C_{20}$ alpha-olefin.

In at least one embodiment, a polyethylene is a copolymer selected from ethylene/propylene (EP) copolymer, ethylene/butene (EB) copolymer, ethylene/hexene (EH) copolymer, ethylene/octene (EO) copolymer, ethylene/alpha-olefin/diene (EAODM) terpolymer, such as ethylene/propylene/octene terpolymer.

In another embodiment, a polyethylene includes one or more diene or triene comonomers. Diene or triene comonomers can include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5 heptadiene; 1,3-butadiene; 1,3-pentadiene, norbornadiene, 1,6-heptadiene; 1,7-octadiene;

1,8-nonadiene; 1,9-decadiene; 1,10-undecadiene; norbornene; tetracyclododecene; or mixtures thereof; and such as butadiene; hexadienes; and octadienes; and most such as 1,4-hexadiene; 1,9-decadiene; 4-methyl-1,4-hexadiene; 5-methyl-1,4-hexadiene; dicyclopentadiene; and 5-ethylidene-2-norbornene (ENB), 1,3-butadiene, 1,3-pentadiene, norbornadiene, and dicyclopentadiene; $C_8$-$C_{40}$ vinyl aromatic compounds including styrene, o-, m-, and p-methylstyrene, divinylbenzene, vinylbiphenyl, vinylnapthalene; and halogen-substituted $C_8$-$C_{40}$ vinyl aromatic compounds such as chlorostyrene and fluorostyrene.

Low density polyethylene is generally prepared at high pressure using free radical initiators or in gas phase processes using Ziegler-Natta or vanadium catalysts. Low density polyethylene typically has a density in the range of 0.916 $g/cm^3$ to 0.950 $g/cm^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 $g/cm^3$ to 0.950 $g/cm^3$, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a $g'_{vis}$ value of 0.97 or above, such as 0.98 or above. Polyethylenes having still greater density are the high density polyethylenes ("HDPEs"), e.g., polyethylenes having densities greater than 0.950 $g/g/cm^3$, and are generally prepared with Ziegler-Natta catalysts or chrome catalysts. Very low density polyethylenes ("VLDPEs") (also known as ultra-low density polyethylene ("ULDPEs")) can be produced by a number of different processes yielding polyethylenes having a density less than 0.916 $g/cm^3$, typically 0.890 $g/cm^3$ to 0.915 $g/cm^3$ or 0.900 $g/cm^3$ to 0.915 $g/cm^3$.

In at least one embodiment, a polyethylene is one or more of a ULDPE, metallocene-based very low-density polyethylene (mVLDPE), low density polyethylene (LDPE), linear low density polyethylene (LLDPE), medium density polyethylene (MDPE), cross-linked polyethylene (PEX or XLPE), high density polyethylene (HDPE), high melt strength high density polyethylene (HMS-HDPE), ultra-high density polyethylene (UHDPE), ultra-high-molecular-weight polyethylene (UHMWPE) and combinations thereof. Exemplary polyethylenes are discussed in Publication Nos. U.S. Pat. No. 7,022,770 B2, WO 2012/096698, and WO 2013/043796, which are incorporated by reference herein.

Exemplary ULDPEs are available from ExxonMobil Chemical Company under the name EXCEED™ 1012 mVLDPE (a resin developed to provide better properties than currently available with conventional VLDPE and ULDPE resins), as well as EXCEED™ 1015HA mVLDPE and EXCEED™ 3812 mVLDPE. Exemplary ULDPEs are also available from The Dow Chemical Company under the tradename ATTANE™, such as ATTANE™ 4201G, ATTANE™ 4203, and ATTANE™ 4404G. The ULDPEs may have a melt mass flow rate from 0.5 g/10 min to 10.0 g/10 min. The ULDPEs may have a melt index of 0.5 g/10 min to 3 g/10 min, such as 0.5 g/10 min to 2 g/10 min, such as 0.5 g/10 min to 1.5 g/10 min, of example of 1.0 g/10 min.

Exemplary LDPEs are available from ExxonMobil Chemical Company under the tradename ENABLE™ 2005HH, ESCORENE™ Ultra FL 00328, ESCOR™ 6000, EXCEED™ 2018MB, and EXXONMOBIL™ LDPE LD 312 Series. Exemplary LDPEs are also available from The Dow Chemical Company under the tradename DOW™ Low Density Polyethylene (LDPE), such as DOW™ LDPE 1321, DOW™ LDPE 50041, and DOW™ LDPE PG 7004. The LDPE may have a melt mass flow rate from 0.2 to 100 g/10 min.

Exemplary LLDPEs are available from ExxonMobil Chemical Company under the tradename EXXONMOBIL™ LLDPE LL 6202.19, EXXONMOBIL™ LLDPE LL 1001AV, and EXXONMOBIL™ LLDPE LL 8460 Series. Exemplary LLDPEs are also available from The Dow Chemical Company under the tradename DOW™ Linear Low Density Polyethylene (LLDPE), such as DOW™ LLDPE DFDA-7047 NT7. The LLDPE may have a melt mass flow rate from 0.2 g/10 min to 50.0 g/10 min.

Suitable MDPEs are available from ExxonMobil Chemical Company under the tradename EXXONMOBIL™ ESCORENE™ LD-117 MDPE, and EXXONMOBIL™ ESCORENE™ LD-129 MDPE. MDPEs are also available from The Dow Chemical Company under the tradename DOW™ Medium Density Polyethylene (MDPE), such as DOW™ MDPE 8818, DOW™ DMDA-8962 NT 7, and DOWLEX™ 2432E. MDPE resins may be characterized as having a density from 0.926 $g/cm^3$ to 0.940 $g/cm^3$.

Suitable HDPEs are available from ExxonMobil Chemical Company under the tradename PAXON™ AL55-003, PAXON™ HYA021L, and EXXONMOBIL™ HDPE HD 7800P. HDPEs are also available from The Dow Chemical Company under the tradename DOW™ HDPE 25055E, DOW™ HDPE KT 10000 UE, and UNIVAL™ DMDA-6200 NT 7.

The polyethylene homopolymers and copolymers described herein can be produced using any suitable catalyst and/or process known for producing polyethylene homopolymers and copolymers. In certain embodiments, the polyethylene homopolymers and copolymers can include polymers prepared according to the procedures in U.S. Pat. Nos. 6,342,566; 6,384,142; 5,741,563; PCT publications WO 03/040201; and WO 97/19991.

Second Polymer: Polypropylene

A "propylene polymer", otherwise known as "polypropylene" or "propylene copolymer", is a polymer or copolymer comprising at least 50 mol % propylene derived units; and so on. The term "polypropylene" is meant to encompass isotactic polypropylene (iPP), defined as having at least 10% or more isotactic pentads, highly isotactic polypropylene, defined as having 50% or more isotactic pentads, syndiotactic polypropylene (sPP), defined as having at 10% or more syndiotactic pentads, homopolymer polypropylene (hPP, also called propylene homopolymer or homopolypropylene), and so-called random copolymer polypropylene (RCP, also called propylene random copolymer). Herein, an RCP can include a copolymer of propylene and 1 to 10 wt % of an olefin chosen from ethylene and $C_4$ to $C_8$ 1-olefins. For example, an isotactic polymer (iPP) can have at least 20% (such as at least 30%, such as at least 40%) isotactic pentads. A polyolefin is "atactic", also referred to as "amorphous", if it has less than 10% isotactic pentads and syndiotactic pentads.

A polypropylene of the present disclosure may be in the form of a copolymer or a homopolymer. For example, the polypropylene is selected from random copolymer polypropylene (rcPP), impact copolymer polypropylene (homopolymer propylene modified with at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof. Exemplary embodiments include a polypropylene homopolymer, e.g., the polypropylene component of the composition may consist essentially of the polypropylene homopolymer.

Suitable propylene-based polymers include propylene homopolymers and propylene copolymers. The propylene copolymer can be a random or block copolymer, propylene-based terpolymer, or a branched polypropylene.

In at least one embodiment, the propylene is copolymerized with ethylene or one $C_4$-$C_{20}$ alpha-olefin. Suitable comonomers include for copolymerizing with propylene include ethylene, 1-butene, 1-pentene, 1-hexene, 1-heptene, 1-octene, 1-nonene, 1-decene, 1-unidecene, 1-dodecene, as well as 4-methyl-1-pentene, 4-methyl-1-hexene, 5-methyl-1-hexene, vinylcyclohexene, and styrene.

Exemplary propylene copolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

In at least one embodiment, the polypropylene polymer is a propylene-alpha-olefin copolymer. The "propylene-alpha-olefin copolymers" described herein are copolymers of propylene derived units and one or more units derived from ethylene or a $C_4$-$C_{20}$ alpha-olefin and optionally one or more diene-derived units, and are relatively elastic and/or form nonwoven fibers and fabrics that are elastic (Ultimate Elongation from greater than 500%). The overall comonomer content of the copolymer is within the range from 5 wt % to 35 wt % in one embodiment.

In at least one embodiment, where more than one comonomer is present, the amount of a particular comonomer may be less than 5 wt %, but the combined comonomer content is greater than 5 wt %. The propylene-alpha-olefin copolymers may be described by any number of different parameters, and those parameters may comprise a numerical range made up of any desirable upper limit with any desirable lower limit as described herein for the propylene-alpha-olefin copolymers.

The propylene-alpha-olefin copolymer may be either a random copolymer (the comonomer-derived units are randomly distributed along the polymer backbone) or a block copolymer (the comonomer-derived units occur along long sequences), or any variation thereof (having some properties of each). The presence of randomness or blocks in a copolymer can be determined by C-NMR as is known in the art.

In at least one embodiment, the propylene-alpha-olefin copolymer comprises ethylene or $C_4$-$C_{20}$ alpha-olefin-derived units (or "comonomer-derived units') within the range of from 5 wt % to 50 wt %, such as 6 wt % to 40 wt %, such as 7 wt % to 35 wt %, such as 8 wt % to 20 wt %, such as 10 wt % to 15 wt % by weight of the copolymer. The propylene-alpha-olefin copolymer may also comprise two different comonomer-derived units. Further, these copolymers and terpolymers may comprise diene-derived units as described below.

In at least one embodiment, the propylene-alpha-olefin copolymer comprises propylene-derived units and comonomer units selected from ethylene, 1-hexene and 1-octene. And in a more particular embodiment, the comonomer is ethylene, and thus the propylene-alpha-olefin copolymer is a propylene-ethylene copolymer.

The polypropylene homopolymers or propylene-alpha-olefin copolymers of the present disclosure can have a melt flow rate ("MFR") of 100 or less g/10 min, such as 50 or less g/10 min, such as 30 or less g/10 min, as measured in accordance with ASTM D 1238 at 230° C./2.16 kg.

In at least one embodiment, the propylene-alpha-olefin copolymer is a terpolymer having 10 wt % or less of diene derived units (or "diene"), such as 8 wt % or less, such as 5 wt % or less, such as 3 wt % or less, based on the total weight of the terpolymer, and within the range of from 0.1 wt % to 10 wt %, such as 0.5 wt % to 8 wt %, such as 1 wt % to 5 wt %.

Suitable dienes include, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), or combinations thereof.

In at least one embodiment, the propylene-based polymers comprise units derived from propylene in an amount of at least 60 wt %, such as at least 80 wt %, such as at least 85 wt % of the polymer (based on the total weight of polymerizable monomers). The amount of units derived from ethylene in propylene/ethylene copolymers can be at least about 0.1 wt %, such as at least about 1 wt %, such as at least about 5 wt %, and the amount of units derived from ethylene present in these copolymers typically is not in excess of about 35 wt %, such as not in excess of about 30 wt %, such as not in excess of about 20 wt % of the copolymer (based on the total weight of the polymer). The amount of units derived from an additional unsaturated comonomer(s), if present, is typically at least about 0.01, such as at least about 1 wt %, such as at least about 5 wt %, and the amount of units derived from the unsaturated comonomer(s) typically does not exceed about 35 wt %, such as it does not exceed about 30 wt %, such as it does not exceed about 20 wt % of the copolymer (based on the total weight of the polymer).

The propylene-based polymer used in the present disclosure may be of any molecular weight distribution (MWD). In at least one embodiment, the propylene-based polymer is a propylene-alpha-olefin copolymer, which has a MWD of 5 or less, such as 4 or less, such as 3 or less. The propylene-alpha-olefin copolymer can have an MWD from 1 to 5, such as from 1.5 to 4.5, such as from 2 to 4. In another embodiment, the MWD is 3.5 or less, such as 3 or less, such as 2.8 or less, such as 2.5 or less, such as 2.3 or less. All individual values and subranges from about 1 to 5 are included herein and disclosed herein.

In at least one embodiment, a propylene-based polymer has a percent crystallinity within the range from 0.5% to 40%, such as from 1% to 30%, such as from 5% to 25%, wherein "percent crystallinity" is determined according to the DSC procedure described herein.

In at least one embodiment, a propylene-based polymer has a percent crystallinity from less than 40%, less than 35%, less than 30%, less than 25%, less than 20%, or less than 15%.

The propylene polymer can have melt flow rate ("MFR"), as measured per ASTM D-1238, 2.16 kg at 230° C., of about 500 or less g/10 min, such as 200 or less g/10 min, such as 100 or less g/10 min, such as 75 or less g/10 min, such as 50 or less g/10 min. A propylene polymer can have an MFR of from about 1 to about 25, such as about 1 to about 20. The crystallinity of the first polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer can be greater than the tacticity of either the blend or the ethylene polymer, e.g., where the propylene polymer is isotactic and the ethylene polymer is atactic.

The crystallinity of the propylene polymer can be expressed in terms of heat of fusion. The propylene polymer of the present disclosure can have a heat of fusion, as determined by DSC, ranging from 1 J/g, or 1.5 J/g, or 3 J/g, or 4 J/g, or 6 J/g, or 7 J/g or 10, to 20 or 30 J/g, or 40 J/g, or 50 J/g, or 60 J/g, or 75 J/g. In one embodiment, the heat of fusion of the propylene polymer is less than 45 J/g. Without wishing to be bound by theory, it is believed that the propylene polymer has generally isotactic crystallizable propylene sequences, and the above heats of fusion are believed to be due to the melting of these crystalline segments.

The level of crystallinity of the propylene polymer can also be reflected in its melting point. For example, a propylene polymer can have a single melting point. However, a sample of propylene copolymer will often show secondary melting peaks adjacent to the principal peak. The highest peak is considered the melting point. The propylene polymer described herein can have a melting point as measured by DSC within the range having an upper limit of 115° C., or 110° C., or 105° C., or 90° C., or 80° C., or 70° C., and a lower limit of 0° C., or 20° C., or 25° C., or 30° C., or 35° C., or 40° C., or 45° C. For example, the propylene polymer can have a melting point of 105° C. or less, such as 100° C. or less, such as 90° C. or less. In at least one embodiment, the propylene polymer has a melting point of 25° C. or greater, or 40° C. or greater.

The propylene homopolymers and copolymers described herein can be produced using any suitable catalyst and/or process known for producing polypropylene homopolymers and copolymers. The polypropylene homopolymers and copolymers may be conventional in composition, and made by gas phase, slurry, or solution type process and commercially available from virtually all large petrochemical corporations, like ExxonMobil Chemical Co., Basell, Novatec, Formosa, etc., under various trade names, such as Achieve, Metocene, etc.

Propylene-Based Elastomers

Compositions of the present disclosure comprise a propylene elastomer ("propylene-based elastomer"). For purposes of the present disclosure, the term "elastomer" means a natural or synthetic polymer having elastic properties (e.g., rubber) and is defined as a rubbery material composed of long chainlike molecules, or polymers, that are capable of recovering their original shape after being stretched to great extents, hence the name "elastomer", from "elastic polymer".

The propylene-based elastomer can be a copolymer of propylene-derived units and units derived from at least one of ethylene or a $C_4$-$C_{10}$ α-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt % of the propylene-based elastomer.

The units, or comonomers, derived from at least one of ethylene or a $C_4$-$C_{10}$ α-olefin may be present in an amount of about 1 wt % to about 35 wt %, or about 5 wt % to about 35 wt %, or about 7 wt % to about 32 wt %, or about 8 wt % to about 25 wt %, or about 8 wt % to about 20 wt %, or about 8 wt % to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min.

In some embodiments, the comonomer is ethylene, 1-hexene, or 1-octene, such as ethylene. In embodiments where the propylene-based elastomer comprises ethylene-derived units, the propylene-based elastomer may comprise about 5 wt % to about 25 wt %, or about 8 wt % to about 20 wt %, or about 9 wt % to about 16 wt %, ethylene-derived units. In some embodiments, the propylene-based elastomer includes units derived from propylene and ethylene and the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Some embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ α-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}C$ NMR, of at least about 75%, at least about 80%, at least about 82%, at least about 85%, or at least about 90%. In at least one embodiment, the propylene-based elastomer has a triad tacticity of about 50% to about 99%, or about 60% to about 99%, or about 75% to about 99%, or about 80 to about 99%. In some embodiments, the propylene-based elastomer may have a triad tacticity of about 60 to 97%.

The propylene-based elastomer has a heat of fusion ("Hf"), as determined by DSC, of about 80 J/g or less, or about 70 J/g or less, or about 50 J/g or less, or about 40 J/g or less. The propylene-based elastomer may have a lower limit Hf of about 0.5 J/g, or about 1 J/g, or about 5 J/g. For example, the Hf value may range from about 1 J/g, 1.5 J/g, 3 J/g, 4 J/g, 6 J/g, or 7 J/g, to about 30 J/g, 35 J/g, 40 J/g, 50 J/g, 60 J/g, 70 J/g, 75 J/g, or 80 J/g.

The propylene-based elastomer may have a percent crystallinity, as determined according to the DSC procedure described herein, of about 2% to about 65%, or about 0.5% to about 40%, or about 1% to about 30%, or about 5% to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25% to about 25%, or in the range of about 0.5% to about 22% of the crystallinity of isotactic polypropylene.

Embodiments of the propylene-based elastomer may have a tacticity index (m/r) (as determined by $^{13}$C NMR) from about 4, or about 6, to about 8, or about 10, or about 12. In some embodiments, the propylene-based elastomer has an isotacticity index (as determined by $^{13}$C NMR) greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkylidene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper amount of about 15%, about 10%, about 7%, about 5%, about 4.5%, about 3%, about 2.5%, or about 1.5%, to a lower amount of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("Tm") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-based elastomer. The propylene-based elastomer may have a Tm of about 110° C. or less, about 105° C. or less, about 100° C. or less, about 90° C. or less, about 80° C. or less, or about 70° C. or less. In some embodiments, the propylene-based elastomer has a Tm of about 25° C. to about 105° C., or about 60° C. to about 105° C., or about 70° C. to about 105° C., or about 90° C. to about 105° C.

The propylene-based elastomer may have a density of about 0.850 g/cm$^3$ to about 0.900 g/cm$^3$, or about 0.860 g/cm$^3$ to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In some embodiments, the propylene-based elastomer may have an MFR of about 2 g/10 min to about 20 g/10 min, or about 2 g/10 min to about 10 g/10 min, or about 2 g/10 min to about 5 g/10 min.

The propylene-based elastomer may have an Elongation at Break of about 2000% or less, about 1800% or less, about 1500% or less, about 1000% or less, or about 800% or less, as measured per ASTM D412.

The propylene-based elastomer may have a weight average molecular weight (Mw) of about 5,000 g/mol to about 5,000,000 g/mol, or about 10,000 g/mol to about 1,000,000 g/mol, or about 50,000 g/mol to about 400,000 g/mol. The propylene-based elastomer may have a number average molecular weight (Mn) of about 2,500 g/mol to about 250,000 g/mol, or about 10,000 g/mol to about 250,000 g/mol, or about 25,000 g/mol to about 250,000 g/mol. The propylene-based elastomer may have a z-average molecular weight (Mz) of about 10,000 g/mol to about 7,000,000 g/mol, or about 80,000 g/mol to about 700,000 g/mol, or about 100,000 g/mol to about 500,000 g/mol.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 wt % to about 95 wt %, based on the total weight of the propylene-based elastomer. The ethylene-derived units are present in an amount of from about 5 wt % to about 18 wt %, for example, about 8 wt % to about 18 wt %, about 8.5 to about 17.5 wt %, about 9 wt % to about 16.5 wt %, about 10 wt % to about 16 wt %, about 10.5 wt % to 15.5 wt %, such as about 11 wt % to about 15, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the present disclosure.

The propylene-based elastomer may comprise copolymers prepared according to the procedures described in WO 02/36651, U.S. Pat. No. 6,992,158, and/or WO 00/01745. Methods for producing the propylene-based elastomer may be found in U.S. Pat. Nos. 7,232,871 and 6,881,800. The present disclosure is not limited by any particular polymerization method for preparing the propylene-based elastomer, and the polymerization processes are not limited by any particular type of reaction vessel.

Suitable propylene-based elastomers may be available commercially under the trade names VISTAMAXX™ (ExxonMobil Chemical Company), VERSIFY™ (The Dow Chemical Company), certain grades of TAFMER™ XM or NOTIO™ (Mitsui Company), and certain grades of SOFTEL™ (Basell Polyolefins).

In at least one embodiment, addition of the propylene-based elastomer can lower the low-temperature tensile elasticity of the composition by 25% or greater, such as 50% or greater, such as 75% or greater, such as 85% or greater, and up to 95%. Values for the tensile elasticity provided herein are determined according to the procedures provided in the Test Methods section, below. Furthermore, in at least one embodiment, the polymeric composition comprising the propylene-based elastomer and ethylene-based plastomer can have a temperature tensile elasticity of 1000 megapascals (MPa) or less, 900 MPa or less, 800 MPa or less, 700 MPa or less, 600 MPa or less, 500 MPa or less, 300 MPa or less, or 200 MPa or less, or 150 MPa or less as determined at 23° C. In such embodiments, the polymeric composition can have a minimum temperature tensile elasticity of 600 MPa or greater. Temperature tensile elasticity is measured at 2 in/min according to ASTM D638, Type IV, t=0.075 inch specimen.

In at least one embodiment, VISTAMAXX™ is used as the propylene-based elastomer, such as, Vistamaxx™ 3020, Vistamaxx™ 6102, Vistamaxx™ 6202 and VISTAMAXX™ 6502. VISTAMAXX™ propylene-based elastomers are copolymers of propylene and ethylene. VISTAMAXX™ are propylene rich (>80%) and are semi-crystalline materials with high amorphous content. Their synthesis is Base on ExxonMobil Chemical Company's EXXPOL™ technology.

VISTAMAXX™ 3020 propylene-ethylene performance polymer ("VM3020") is available from ExxonMobil Chemical Company. VM3020 has an ethylene content of 11 wt % with the balance being propylene. Typical properties of VM3020 include: a density of 0.874 g/cm$^3$ (ASTM D1505); a melt index of 1.2 g/10 min (ASTM D1238; 190° C., 2.16 kg); a melt mass flow rate of 3 g/10 min (230° C., 2.16 kg); a Shore D hardness of 34 (ASTM D2240); and a Vicat softening temperature (VST) of 67° C.

VISTAMAXX™ 6102 propylene-ethylene performance polymer ("VM6102") is available from ExxonMobil Chemical Company. VM6102 has an ethylene content of 16 wt % with the balance being propylene. Typical properties of VM6102 include: a density of 0.862 g/cm$^3$ (ASTM D1505); a melt index of 1.4 g/10 min (ASTM D1238; 190° C., 2.16 kg); a melt mass flow rate of 3 g/10 min (230° C., 2.16 kg); a Shore A hardness of 66 (ASTM D2240); and a Vicat softening temperature of 52.2° C. (ASTM D1525).

VISTAMAXX™ 6202 propylene-ethylene performance polymer ("VM6202") is available from ExxonMobil Chemical Company. VM6202 has an ethylene content of 15 wt % with the balance being propylene. Typical properties of VM6202 include: a density of 0.863 g/cm$^3$ (ASTM D1505); a melt index of 9.1 g/10 min (ASTM D1238; 190° C., 2.16 kg); a melt mass flow rate of 20 g/10 min (230° C., 2.16 kg); a Shore A hardness of 66 (ASTM D2240); and a Vicat softening temperature of 47.2° C. VM6202 is an essentially amorphous HMW SSC-PP copolymer having a weight average molecular weight (Mw) of about 144,700 g/mol, a DSC melting point of about 101° C., a DSC melt enthalpy of about 11.4 J/g.

VISTAMAXX™ 6502 propylene-ethylene performance polymer ("VM6502") is available from ExxonMobil Chemical Company, Houston, Tex. VM6502 is an amorphous HMW SSC-PP copolymer containing about 13% by weight of ethylene comonomer and having a weight average molecular weight (Mw) of about 119,000 g/mol, a DSC melting point of about 64° C., a DSC melt enthalpy of about 9 J/g, a density of about 0.865 g/cm$^3$ at 23° C. per ASTM D1505, and a melt flow rate of about 48 g/10 min per ASTM D1238 at 230° C./2.16 kg test conditions.

Ethylene-Based Plastomers

Compositions of the present disclosure include an ethylene plastomer ("ethylene-based plastomer"). Ethylene-based plastomers include those having from about 15 wt % to about 35 wt % units derived from C$_4$-C$_{10}$ α-olefins, based on total weight of the ethylene-based plastomer, which may have an: ethylene content of from 50 wt % to 90 wt % (such as 60 wt % to 85 wt %, or 65 wt % to 80 wt %, or 65 wt % to 75 wt %); ethylene content of from 80 mol % to 96 mol % (such as 82 mol % to 92 mol %, or 82 mol % to 88 mol %, or 84 mol % to 86 mol %); 1-butene content of 15 wt % or more (such as 20 wt % or more, or 25 wt % or more); 1-hexene content of 20 wt % or more (such as 25 wt % or more, or 30 wt % or more); and/or 1-octene content of 25 wt % or more (such as 30 wt % or more, or 35 wt % or more).

Ethylene-based plastomers may have one or more of the following properties: density of 0.91 g/cm$^3$ or less (such as 0.905 g/cm$^3$ or less, or 0.902 g/cm$^3$ or less, or 0.85 g/cm$^3$ or more, or 0.86 g/cm$^3$ or more, or 0.87 g/cm$^3$ or more, or 0.88 g/cm$^3$ or more, or 0.885 g/cm$^3$ or more, or 0.85 g/cm$^3$ to 0.91 g/cm$^3$, or 0.86 g/cm$^3$ to 0.91 g/cm$^3$, or 0.87 g/cm$^3$ to 0.91 g/cm$^3$, or 0.88 g/cm$^3$ to 0.905 g/cm$^3$, or 0.88 g/cm$^3$ to 0.902 g/cm$^3$, or 0.885 g/cm$^3$ to 0.902 g/cm$^3$); heat of fusion (H$_f$) of 90 J/g or less (such as 70 J/g or less, or 50 J/g or less, or 30 J/g or less, alternatively from 10 J/g to 70 J/g, or 10 J/g to 50 J/g, or 10 J/g to 30 J/g); crystallinity of 40% or less (such as 30% or less, or 20% or less, such as at least 5%, or from 5% to 30%, or from 5% to 20%); melting point (Tm, peak first melt) of 100° C. or less (such as 95° C. or less, or 90° C. or less, or 80° C. or less, or 70° C. or less, or 60° C. or less, or 50° C. or less); crystallization temperature (T$_c$, peak) of 90° C. or less (such as 80° C. or less, or 70° C. or less, or 60° C. or less, or 50° C. or less, or 40° C. or less); glass transition temperature (T$_g$) of −20° C. or less (such as −30° C. or less, or −40° C. or less); M$_w$ of 30 kg/mol to 2,000 kg/mol (such as 50 kg/mol to 1,000 kg/mol, or 90 kg/mol to 500 kg/mol); M$_w$/M$_n$ of from 1 to 40 (such as 1.4 to 20, or 1.6 to 10, or 1.8 to 3.5, or 1.8 to 2.5); branching index (g') of from 1.4 to 20 (such as 1.6 to 10, or 1.8 to 10); melt index (MI, 2.16 kg at 190° C.) of 0.1 to 100 g/10 min (such as 0.3 to 60 g/10 min, or 0.5 to 40 g/10 min, or 0.7 to 20 g/10 min); and/or Composition Distribution Breadth Index ("CDBI") of at least 60 wt % (such as at least 70 wt %, or at least 80 wt %, or at least 90 wt %, or at least 95 wt %).

Test methods to measure crystallinity derived from ethylene, heat of fusion, reactivity ratio, proportion of inversely propylene units, and branching index are disclosed in U.S. Application Ser. No. 62/268,112, filed on Dec. 16, 2015, incorporated herein by reference.

Branching Index is an indication of the amount of branching of the polymer and is defined as g'=[Rg]$^2_{br}$/[Rg]$^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "[Rg]$_{br}$" is the Radius of Gyration for the branched polymer sample and "[Rg]$_{lin}$" is the Radius of Gyration for a linear polymer sample.

The method of making the ethylene-based plastomer can be slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems, or combinations thereof.

Ethylene copolymers may be produced using a metallocene catalyst system, i.e., a mono- or bis-cyclopentadienyl transition metal catalyst in combination with an activator of alumoxane and/or a non-coordinating anion in solution, slurry, high-pressure, or gas-phase. The catalyst and activator may be supported or unsupported and the cyclopentadienyl rings may be substituted or unsubstituted. Information on the methods and catalysts/activators to produce such mPE homopolymers and copolymers is available in WO 94/26816; WO 94/03506; EPA 277,003; EPA 277,004; U.S.

Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92/00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506; and U.S. Pat. No. 5,055,438. More generally, exemplary plastomers are produced using a single-site catalyst, whether a metallocene catalyst or not, and have an Mw/Mn of 1.5 to 3 (such as 1.8 to 2.5) and a CDBI of 70% or more (such as 80% or more, or 90% or more).

Plastomers that are useful in the compositions of the present disclosure include those commercially available under the trade names EXACT™ (ExxonMobil Chemical Company), AFFINITY™, ENGAGE™, FLEXOMER™ (The Dow Chemical Company), QUEO™ (Borealis AG, Austria), and TAFMER™ (Mitsui Company).

In at least one embodiment, ENGAGE™ is used as second olefin elastomer, such as, ENGAGE™ 8100 and ENGAGE™ 8411. ENGAGE™ 8100 is available from The Dow Chemical Company. ENGAGE™ 8100 is an ethylene-octene copolymer containing 35.5 wt % of octene. Typical properties of ENGAGE™ 8100 include: a density of 0.870 g/cm$^3$ (ASTM D1505); a melt index of 1.0 g/10 min (ASTM D1238; 190° C., 2.16 kg); a Shore D hardness of 22 (ASTM D2240); a Shore A hardness of 73 (ASTM D2240); and a Vicat softening temperature (VST) of 113° C. (ASTM D1525).

ENGAGE™ 8411 is available from The Dow Chemical Company. ENGAGE™ 8411 is an ethylene-octene copolymer containing 35.5 wt % of octene. Typical properties of ENGAGE™ 8411 include: a density of 0.880 g/cm$^3$ (ASTM D1505); a melt index of 18.0 g/10 min (ASTM D1238; 190° C., 2.16 kg); a Shore A hardness of 81 (ASTM D2240); a Shore D hardness of 27 (ASTM D2240); and a DSC melting peak of 72° C. (rate 10° C./min).

Compositions

Compositions of the present disclosure are compositions including a first polymer (polyethylene), a second polymer (polypropylene), a propylene based elastomer, and an ethylene-based plastomer. In at least one embodiment, the amount of first polymer (polyethylene)+second polymer (polypropylene) in a composition is from 10 wt % to 99 wt %, based upon the weight of the composition, such as 20 wt % to 95 wt %, such as 30 wt % to 90 wt %, such as 40 wt % to 90 wt %, such as 50 wt % to 90 wt %, such as 60 wt % to 90 wt %, such as 70 wt % to 90 wt %. In at least one embodiment, the amount of propylene-based elastomer in a composition is from 0.1 wt % to 50 wt %, based upon the weight of the composition, such as 0.2 wt % to 20 wt %, such as 0.3 wt % to 10 wt %, such as 0.4 wt % to 9 wt %, such as 0.5 wt % to 8 wt %, such as 1 wt % to 7 wt %, such as 2 wt % to 5 wt %. In at least one embodiment, the amount of ethylene-based plastomer in a composition is from 0.1 wt % to 50 wt %, based upon the weight of the composition, such as 0.2 wt % to 20 wt %, such as 0.3 wt % to 10 wt %, such as 0.4 wt % to 9 wt %, such as 0.5 wt % to 8 wt %, such as 1 wt % to 7 wt %, such as 2 wt % to 5 wt %.

In at least one embodiment, a ratio (by weight) of propylene-based elastomer to ethylene-based plastomer in a composition is about 90:10, or from about 80:20 to 10:90, or 70:30 to 20:80, or 60:40 to 30:70 or 50:50 to 40:60, such as about 50:50.

In at least one embodiment, a ratio (by weight) of ethylene polymer to propylene polymer in a composition is about 90:10, or from about 80:20 to 10:90, or 70:30 to 20:80, or 60:40 to 30:70, or 50:50 to 40:60, such as about 50:50.

Compositions (also referred to as "blends") of the present disclosure may be produced by mixing the first polymer (polyethylene), the second polymer (polypropylene), the propylene-based elastomer and the ethylene-based plastomer together, by connecting reactors together in series to make reactor blends or by using more than one catalyst, for example, a dual metallocene catalyst, in the same reactor to produce multiple species of polymer. The polymers can be mixed together prior to being put into an extruder or may be mixed in an extruder.

The compositions may be formed by dry blending the individual polymers and subsequently melt mixing in a mixer, or by mixing the polymers together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the composition, in one or more components of the composition, and/or in a product formed from the composition, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

In at least one embodiment, the amount of additive in a composition is less than 10 wt %, such as less than 5 wt %, such as less than 1 wt %, such as about 0 wt %.

The polymers and components of the present disclosure can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of the components of the composition.

Mixing may involve first dry blending using, for example, a tumble blender, where the polymers (and optional additive) are brought into contact first, without intimate mixing, which may then be followed by melt blending in an extruder. Another method of blending the components is to melt blend the first polymer as a pellet and the second polymer as a pellet directly in an extruder or batch mixer. It can also involve a "master batch" approach, where the final modifier concentration is achieved by combining a neat polymer with an appropriate amount of modified polymer that had been previously prepared at a higher additive concentration. The mixing may take place as part of a processing method used to fabricate articles, such as in the extruder on an injection molding machine or blown-film line or fiber line.

In at least one embodiment of the present disclosure, the first polymer (polyethylene), second polymer (polypropylene), the propylene-based elastomer and/or the ethylene-based plastomer can be "melt blended" in an apparatus such as an extruder (single or twin screw) or batch mixer. The first polymer (polyethylene), second polymer (polypropylene), the propylene-based elastomer and/or the ethylene-based plastomer may also be "dry blended" with one another using a tumbler, double-cone blender, ribbon blender, or other suitable blender. In yet another embodiment, the first polymer (polyethylene), second polymer (polypropylene), the propylene-based elastomer and/or the ethylene-based plastomer are blended by a combination of approaches, for example a tumbler followed by an extruder. A suitable method of blending is to include the final stage of blending as part of an article fabrication step, such as in the extruder used to melt and convey the composition for a molding step like injection molding or blow molding. This can include direct injection of one or more polymer, elastomer and/or plastomer into the extruder, either before or after a different one or more polymer, elastomer and/or plastomer is fully melted. Extrusion technology for polymers is described in more detail in, for example, PLASTICS EXTRUSION TECHNOLOGY p. 26-37 (Friedhelm Hensen, ed. Hanser Publishers 1988).

In another aspect of the present disclosure, the first polymer (polyethylene), second polymer (polypropylene), the propylene-based elastomer and/or the ethylene-based plastomer may be blended in solution by any suitable means by using a solvent that dissolves the components of the composition to a significant extent. The blending may occur at any temperature or pressure where the components remain in solution. Suitable conditions include blending at high temperatures, such as 10° C. or more, such as 20° C. or more over the melting point of one or more polymer, elastomer and/or plastomer. Such solution blending would be particularly useful in processes where one or more polymer, elastomer and/or plastomer is made by solution process and a modifier is added directly to the finishing train, rather than added to the dry polymer, elastomer and/or plastomer in another blending step altogether. Such solution blending would also be particularly useful in processes where one or more polymer, elastomer and/or plastomer is made in a bulk or high pressure process where one or more polymer, elastomer and/or plastomer and the modifier are soluble in the monomer. As with the solution process, one or more polymer, elastomer and/or plastomer can be added directly to the finishing train rather than added to the dry one or more polymer, elastomer and/or plastomer in another blending step altogether.

Accordingly, in the cases of fabrication of products using methods that involve an extruder, such as injection molding or blow molding, any suitable means of combining the one or more polymer, elastomer and/or plastomer to achieve the desired composition serve equally well as fully formulated pre-blended pellets, since the forming process can include a re-melting and mixing of the raw material; example combinations include simple blends of neat polymer, elastomer and/or plastomer pellets (and optional additive(s)), neat polymer, elastomer and/or plastomer granules, and neat polymer, elastomer and/or plastomer pellets and pre-blended pellets. However, little mixing of the melt components occurs in the process of compression molding, and pre-blended pellets would be preferred over simple blends of the constituent pellets.

In another embodiment, a composition of the present disclosure is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The heterogeneous polymer blends described herein may be formed into desirable end use products by any suitable means. They are particularly useful for making articles by blow molding, extrusion, injection molding, thermoforming, gas foaming, elasto-welding and compression molding techniques.

Blow molding forming means, for example, includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In at least one embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C., such as between 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending in part on the thickness. Finally, the mold is opened and the shaped composite article ejected. Likewise, molded articles may be fabricated by injecting molten polymer into a mold that shapes and solidifies the molten polymer into a desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded article. Sheet made from a composition of the present disclosure may be used to form a container. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C.

In an embodiment of the injection molding process, where a substrate material is injection molded into a tool including the shaped laminate, the melt temperature of the substrate material is between 230° C. and 255° C. in one embodiment, and between 235° C. and 250° C. in another embodiment, the fill time is from 2 to 10 seconds in one embodiment, from 2 to 8 seconds in another embodiment, and a tool temperature of from 25° C. to 65° C. in one embodiment, and from 27° C. and 60° C. in another embodiment. In at least one embodiment, the substrate material is at a temperature that is hot enough to melt any tie-layer material or backing layer to achieve adhesion between the layers.

In yet another embodiment of the present disclosure, the compositions are secured to a substrate material using a blow molding operation. Blow molding is particularly useful in such applications as for making closed articles such as fuel tanks and other fluid containers, playground equipment, outdoor furniture and small enclosed structures. In one embodiment of this process, a composition of the present disclosure is extruded through a multi-layer head, followed by placement of the uncooled laminate into a parison in the mold. The mold, with either male or female patterns inside, is then closed and air is blown into the mold to form the part. It will be understood by those skilled in the art that the steps outlined above may be varied, depending upon the desired result. For example, an extruded sheet formed from a composition of the present disclosure may be directly thermoformed or blow molded without cooling, thus skipping a cooling step. Other parameters may be varied as well in order to achieve a finished composite article having desirable features.

In at least one embodiment, a composition of the present disclosure is formed into an article such as a weather seal, a hose, a belt, a gasket, a molding, boots, an elastic fiber and like articles. Foamed end-use articles are also envisioned. More specifically, the blends of the present disclosure can be formed as part of a vehicle part, such as s weather seal, a brake part including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with fractioned outside faces. Vehicles contemplated where these parts will find application include, but are not limited to passenger autos, motorcycles, trucks, boats and other vehicular conveyances.

Notched Charpy Impact Strength: Charpy impact test, also known as the Charpy V-notch test, is a standardized high strain-rate test which determines the amount of energy absorbed by a material during fracture. The quantitative result of the impact tests the energy needed to fracture a material and can be used to measure the toughness of the material. The Notched Charpy impact strength is measured as per ISO 179-1/1eA, using equipment made by Empire Technologies Inc. In at least one embodiment, a composition of the present disclosure has a Notched Charpy impact strength at 23° C. of 8 kJ/m$^2$ or greater, such as 10 kJ/m$^2$ or greater, such as 12 kJ/m$^2$ or greater, such as 14 kJ/m$^2$ or greater, such as 20 kJ/m$^2$ or greater, such as 30 kJ/m$^2$ or greater, such as 40 kJ/m$^2$ or greater (or within a range of from 8 kJ/m$^2$ or 25 kJ/m$^2$ or 30 kJ/m$^2$ to 16 kJ/m$^2$ or 20 kJ/m$^2$ or 30 kJ/m$^2$ or 40 kJ/m$^2$ or 50 kJ/m$^2$ or 60 kJ/m$^2$ or 70 kJ/m$^2$ or 80 kJ/m$^2$).

Notched Izod Impact Strength: The Notched Izod impact strength is measured as per ASTM D256, using equipment made by Empire Technologies Inc. In at least one embodiment, a composition of the present disclosure has a Notched Izod impact strength at 23° C. of 2 ft-lb/in. or greater, such as 3 ft-lb/in. or greater, such as 4 ft-lb/in. or greater, such as 5 ft-lb/in. or greater, such as 6 ft-lb/in. or greater (or within a range of from 2 ft-lb/in. or 5 ft-lb/in. to 6 ft-lb/in. or 7 ft-lb/in. or 8 ft-lb/in. or 9 ft-lb/in. or 10 ft-lb/in. or 11 ft-lb/in.).

Sub-micron Domains: The size and concentration of microdomains of second polymer (polypropylene) formed in the bulk domain (first polymer (polyethylene)) can be determined using Atomic Force Microscopy.

For Atomic Force Microscopy, a sample is cryo-microtomed prior to scanning in order to create a smooth surface at −125° C. and purged under $N_2$ in a desiccator before AFM imaging. Imaging is conducted according to EM-120 on the Icon AFM. The scan sizes include 85 μm and 45 μm on the bulk area in two areas. TESPA tips are used for scans, and the data channels monitored are height and phase.

A composition of the present disclosure has a submicron domain content, defined as the percentage of domains having a diameter of 1 micron or less, based on the amount of total microdomains of second polymer of a given area of the composition sample, as determined by Atomic Force Microscopy. In at least one embodiment, at least a portion (e.g. a 1 mm$^2$ area) of a composition of the present disclosure has a submicron domain content of 50% or greater per mm$^2$, such as 60% or greater, such as 70% or greater, such as 80% or greater, such as 90% or greater.

Films

Compositions of the present disclosure can be used in monolayer films or multilayer films. These films may be formed by any suitable extrusion or coextrusion technique. Films may be unoriented, uniaxially oriented, or biaxially oriented. Physical properties of the film may vary depending on the film forming techniques used.

One or more of the foregoing polymers, such as the foregoing blends thereof, may be used in a variety of end-use applications, such as mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film and then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 μm to 50 μm are usually suitable. Films intended for packaging are usually from 10 μm to 50 μm thick. The thickness of the sealing layer is typically 0.2 μm to 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

Films of the present disclosure include any suitable film structure and film application. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any suitable technique, such as for example, techniques utilized to prepare blown, extruded, and/or cast stretch and/or shrink films (including shrink-on-shrink applications).

In one embodiment, multilayer films (or multiple-layer films) may be formed by any suitable method. The total thickness of multilayer films may vary based upon the application desired. A total film thickness of about 5 μm-100 μm, more typically about 10 μm-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

To facilitate discussion of different film structures, the following notation is used herein. Each layer of a film is denoted "A" or "B". Where a film includes more than one A layer or more than one B layer, one or more prime symbols (', ", "', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'"; (d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", AB/A'/A"/B, B/A/A'/A"/B', A/A'/B/B'/B", A/B/A'/B'/B", A/B/B'/B"/A', A/B/B'/B"/A", B/A/B'/A'/B", B/A/B'/B"/A', A/B/B'/B'"/B", B/A/B'/B"/B'", B/B'/A/B"/B'", and B/B'/B"/B'"/B""; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

The films can further be embossed, or produced or processed according to other known film processes. The films can be tailored to specific applications by adjusting the thickness, materials and order of the various layers, as well as the additives in or modifiers applied to each layer.

In at least one embodiment, the melt strength of a film may be from about 1 to about 100 cN, about 1 to about 50 cN, about 1 to about 25 cN, about 3 to about 15 cN, about 4 to about 12 cN, or about 5 to about 10 cN, or about 5 to about 15 cN, when measured at 190° C. In some embodiments, the film has a melt strength of at least about 5 cN, at least about 10 cN, or at least about 15 cN, and 30 up to about 20 cN, when measured at 190° C. The melt strength of a film at a particular temperature may be determined with a Gottfert Rheotens Melt Strength Apparatus. To determine the melt strength, a film melt strand extruded from the capillary die is gripped between two counter-rotating wheels on the apparatus. The take-up speed is increased at a constant acceleration of 2.4 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The film melt is extruded from the die at a speed of 10 mm/sec. The distance between the die exit and the wheel contact point should be 122 mm.

In at least one embodiment, a film of the present disclosure has an averaged 1% Secant Modulus (M), at 23° C. according to ASTM D790, Procedure B, of from about 10,000 psi to about 250,000 pounds per square inch (psi). In at least one embodiment, a film has an averaged 1% Secant Modulus (M), at 23° C. according to ASTM D790, Procedure B, of from about 20,000 psi to about 40,000 psi, such as from about 20,000 to about 35,000 psi, alternatively, from about 25,000 psi to about 35,000 psi, such as from about 30,000 psi to about 35,000 psi. In at least one embodiment, a film has a TD 1% Secant Modulus of from about 20,000 psi to about 40,000 psi, such as from about 20,000 to about 35,000 psi, alternatively, from about 30,000 psi to about 35,000 psi, such as from about 33,000 psi to about 35,000 psi.

A film of the present disclosure also has an Elmendorf Tear value, in accordance with ASTM D-1922. In at least one embodiment, a film has an Elmendorf Tear (MD) of at least 100 g/mil, such as at least 120 g/mil, such as at least 125 g/mil, or such as at least 130 g/mil. For example, the Elmendorf Tear (MD) can be from about 100 g/mil to about 200 g/mil, from about 100 g/mil to about 150 g/mil, from about 100 g/mil to about 130 g/mil, from about 120 to about 130 g/mil, or from about 125 to about 130 g/mil.

A film of the present disclosure also has an Elmendorf Tear value, in accordance with ASTM D-1922. In at least one embodiment, a film has an Elmendorf Tear (TD) of at least 200 g/mil, such as at least 250 g/mil, such as at least 300 g/mil, or such as at least 350 g/mil. For example, the Elmendorf Tear (TD) can be from about 200 g/mil to about 600 g/mil, from about 250 g/mil to about 500 g/mil, from about 300 g/mil to about 400 g/mil, from about 300 to about 350 g/mil, or from about 320 g/mil to about 340 g/mil.

A film of the present disclosure also has a Dart Drop Impact (or Dart F50 or Dart Drop Impact Strength (DIS), reported in grams (g) or grams per mil (g/mil), in accordance with ASTM D-1709, method A. A film of the present disclosure can have a Dart Drop Impact of from about 50 g/mil to about 600 g/mil. In at least one embodiment, the film has a Dart drop of at least about 200 g/mil, such as at least about 250 g/mil, such as at least about 300 g/mil, such as at least about 350 g/mil. For example, the Dart drop can be from about 200 g/mil to about 550 g/mil, from about 250 g/mil to about 400 g/mil, from about 300 g/mil to about 350 g/mil. Alternatively, a film has a Dart drop of at least about 100 g/mil, such as at least about 110 g/mil, such as at least about 120 g/mil, such as at least about 130 g/mil. For example, the Dart drop can be from about 100 g/mil to about 300 g/mil, from about 110 g/mil to about 200 g/mil, from about 120 g/mil to about 150 g/mil.

Shrink of a film, reported as a percentage, can be measured by cutting circular specimens from a film using a 100 mm die. The samples can be marked in their respective directions, dusted with talc, and placed on a pre-heated, talc covered tile. The samples can then heated using a heat gun (e.g., model HG-501A) for approximately 10 to 45 seconds, or until any dimensional change ceases. Values are the average of three specimens. A negative shrinkage number indicates expansion of a dimension after heating when compared to its pre-heating dimension.

In at least one aspect, a film has a TD shrink at 150° C. of at least about 20%, such as at least about 25%. For example, the film has a TD shrink at 130° C. of at least about 20%, such as at least about 30%, such as at least about 35%. For example, the film has a TD shrink at 120° C. of at least about 20%, such as at least about 25%.

In at least one aspect, a film has an MD shrink at 150° C. of at least about 50%, such as at least about 60%. For example, the film has an MD shrink at 130° C. of at least about 40%, such as at least about 50%, such as at least about 60%. For example, the film has an MD shrink at 120° C. of at least about 30%, such as at least about 40%.

In at least one embodiment, the film has a combination of the various Dart drop and TD shrink properties set forth herein. For example, the film can have a Dart drop of at least about 200 g/mil, and a TD shrink at 150° C. of at least about 50%, or a Dart drop of at least about 250 g/mil and a TD shrink at 130° C. of at least about 40%, or a Dart drop at least 100 g/mil, such as at least about 300 g/mil, and a TD shrink at 120° C. of at least about 30%.

In at least one embodiment, the film has a total MD/TD shrink (i.e. sum of the MD shrink and TD shrink) at 150° C. of greater than about 100%, such as greater than about 110%, such as greater than about 120%, such as greater than about 130%. For example, the film has a total MD/TD shrink at 130° C. of greater than about 100%, such as greater than about 110%, such as greater than about 120%, such as greater than about 130%. For example, the film has a total MD/TD shrink at 120° C. of greater than about 100%, such as greater than about 110%.

A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. In at least one embodiment, a film has a strain hardening ratio of from about 1 to about 8, such as from about 1 to about 5, such as from about 2 to about 5.

The performance of the polymer composition being formed into a film can be characterized as a Maximum Die Rate. The "Maximum Die Rate" is a normalized extrusion rate by die size which is commonly used in the blown film industry. The Maximum Die Rate as used herein is expressed as: Maximum Die Rate [lb/in-hr]=Extrusion Rate [lb/hr]/Die Circumference [inch]. The metric definition of the Maximum Die Rate is expressed as: Maximum Die Rate [kg/mm-hr]=Extrusion Rate [kg/hr]/Die Diameter [mm]. The Maximum Die Rate at which the film is formed can be greater than about 13 lb/in-hr (0.73 kg/mm-hr) or about 16 lb/in-hr (0.90 kg/mm-hr) or about 24 lb/in-hr (1.34 kg/mm-hr) in any embodiment, or within a range from about 13 lb/in-hr (0.73 kg/mm-hr), or about 16 lb/in-hr (0.90 kg/mm-hr), or about 24 lb/in-hr (1.34 kg/mm-hr) to about 30 (1.69 kg/mm-hr), or about 40 lb/in-hr (2.25 kg/mm-hr); and such as the Maximum Rate of extrusion is within a range from about 350 lb/hr (159 kg/hr) to about 500 lb/hr (227 kg/hr). Note that for the "Maximum Die Rate" in the English unit, the die dimension is the die circumference, while in metric unit, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

Stretch Films

Compositions of the present disclosure may be utilized to prepare stretch films. Stretch films can be used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

Compositions of the present disclosure may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films can be used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40.

Retail films can be used for packaging and/or bundling articles for consumer use, such as, for example, in supermarket goods. Such films are typically formed in a single bubble blown extrusion process to a thickness of about 35 to 80 μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

Compositions of the present disclosure may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Bags include those bag structures and bag applications known to those skilled in the art. Exemplary bags include shipping sacks, trash bags and liners, industrial liners, produce bags, and heavy duty bags.

Packaging

Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

Compositions of the present disclosure may be used in suitable blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process can be performed to provide any suitable design having a hollow shape, including bottles, tanks, toys, household goods, automobile parts, and other hollow containers and/or parts.

Blow molding processes may include extrusion and/or injection blow molding, as described above. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

Compositions of the present disclosure may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Compositions of the present disclosure may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetic attributes of the non-polymer substrate. In this process, the substrate is typically fed from a roll into a molten polymer as the polymer is extruded from a slot die, which is similar to a cast film process. The resultant structure is cooled, typically with a chill roll or rolls, and formed into finished rolls.

Extrusion coating materials can be used in, for example, food and non-food packaging, pharmaceutical packaging, and manufacturing of goods for the construction (insulation elements) and photographic industries (paper).

Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising the compositions of the present disclosure. Such devices include, for example, electronic cables, computer and computer-related equipment, marine cables, power cables, telecommunications cables or data transmission cables, and combined power/telecommunications cables.

Electrical devices can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Rotomolded Products

Also provided are rotomolded products including one or more layers formed of or comprising the compositions of the present disclosure. Rotomolding or rotational molding involves adding an amount of material to a mold, heating and slowly rotating the mold so that the softened material coats the walls of the mold. The mold continues to rotate at all times during the heating phase, thus maintaining even thickness throughout the part and preventing any deformation during the cooling phase. Examples of rotomolded products include but are not limited to furniture, toys, tanks, road signs tornado shelters, containers including United Nations-approved containers for the transportation of nuclear fissile materials.

Environmental Stress Crack Resistance (ESCR)

ESCR is useful for, for example, the blow molding or extrusion industry for applications such as household/industrial chemical containers, liquid food packaging, and pipes. ESCR is measured according to ASTM D-1693, Condition B using 100% Igepal CO-630.

In at least one embodiment of the present disclosure, a composition has an ESCR greater than the ESCR of the first PE when VISTAMAXX™ is present. In at least one embodiment of the present disclosure, the measured ESCR value for a composition having VISTAMAXX™ is 1.5 fold greater than a composition having only first polymer and second polymer without VISTAMAXX™, such as is 2 fold or greater, such as is 2.5 fold or greater, such as is 3 fold or greater, such as is 3.5 fold or greater.

In further embodiments, a composition of the present disclosure has a density (190° C./2.16 kg based on ASTM D4883) of from about 0.945 g/cm$^3$ to about 0.960 g/cm$^3$, such as from about 0.948 g/cm$^3$ to about 0.957 g/cm$^3$, such as from about 0.950 g/cm$^3$ to about 0.960 g/cm$^3$, such as from about 0.955 g/cm$^3$ to about 0.960 g/cm$^3$.

EXAMPLES

Test Methods

The properties cited below were determined in accordance with the following test procedures. Where any of these properties is referenced in the appended claims, it is to be measured in accordance with the specified test procedure.

Elongation at Break, reported as a percentage (%), was measured as specified by ASTM D-882.

1% Secant Modulus (M), reported in pounds per square inch (lb/int or psi), was measured at 0.5 in/min as specified by ASTM D790, Procedure B.

Izod Impact, method of determining the impact resistance of materials, is reported in foot-pounds per inch, was determined according to ASTM D-4812.

Tensile Elasticity (Dynamic Mechanical Analysis)

Tensile elasticity is measured at 2 in/min according to ASTM D638, Type IV, t=0.075 inch specimen.

Measuring the tensile elasticity (E'), otherwise referred to as the real or elastic component of the Young's modulus, can be performed by testing a compression-molded plaque using a DMA Q800 made by TA Instruments Inc. The data are collected with the use of a Dynamic Mechanical Analysis ("DMA") bending test procedure using a single cantilever setup, wherein the sample is mounted onto a stationary clamp at one end, while the other end is mounted onto a movable clamp. The movable clamp then bends the sample in a sinusoidal motion by applying a small strain percent of 0.025% during the test. The frequency of the bending motion is 1 Hz. While sample is being bent, it goes through a temperature ramp program from −30° C. to +90° C. via a rate increase of 3° C. per minute. The resulting measurements are then processed by the standard machine software, and the E' (and E", the viscous analog) data are reported. In a bending DMA procedure, the machine applies a prescribed force and then directly measures the amplitude of the sample's deformation and the phase angle of the responding force. In its simplest form (i.e., as a function of time rather than frequency), a material's stiffness may be calculated according to:

$K$=force applied/amplitude of deformation

The material's Geometry Factor (GF) is defined as:

$GF=L/A$ where L=sample's length, A=sample's cross-sectional area, and the Young's modulus is then calculated as:

$E=K*(GF)$

However, it is also possible to re-express Young's modulus as a dynamic modulus E*, a function of frequency, or ω-composed of its in-phase and out-of-phase components (E' and E" as introduced above) so as to enable the calculation of those elastic and viscous-specific parameters.

Tensile elasticity (E') can be calculated, for example, by the first formula below, where δ is the phase angle of the responding force from the experiment:

$E'$=(stress/strain)cos(δ)

$E''$=(stress/strain)sin(δ)

$E*(\omega)=E'(\omega)+iE''(\omega)$

And tan delta, in bending deformation test, is coincidentally then related to the dynamic moduli according to:

$$\text{Tan}(\delta) = E''/E'$$

As a technical reference for the above discussion, see, for example: Young, R. J. and Lovell, P. A, Introduction to Polymers, Second Edition, CRC Press, 1991, Chapter 5.

Notched Charpy Impact Strength:

The Notched Charpy impact strength was measured at 23° C. as per ISO 179, using equipment made by Empire Technologies Inc.

Notched Izod Impact Strength:

The Notched Izod impact strength was measured as per ASTM D256, using equipment made by Empire Technologies Inc.

Atomic Force Microscopy (AFM)

Each sample was cryo-microtomed prior to scanning in order to create a smooth surface at −125° C. and purged under $N_2$ in a desiccator before AFM imaging. Imaging was conducted according to EM-120 on the Icon AFM. The scan sizes include 85 μm and 45 μm on the bulk area in two areas. TESPA tips are used for scans, and the data channels monitored are height and phase.

The immiscibility tendencies of HDPE and PP create a blend with limited properties, thus leading to a need for property enhancements by incorporating a small percent by weight (5-15%) of VISTAMAXX™. It was discovered that the impact, flowability, and environmental stress crack resistance (ESCR) properties of the post-consumer polyolefin material greatly increased. Since VISTAMAXX™ contains both ethylene and propylene, it bridges the gap between the polypropylene and polyethylene material, increasing the impact properties and even surrounding the contamination domains. High temperature $^{13}C$ NMR was used to determine an approximate level of polyolefinic contamination. Furthermore, the effects of adding both VISTAMAXX™ and ENGAGE™ to the PCR material tends to yield even greater impact results. Atomic Force Microscopy images show that the HDPE-rich PCR material, the blend having the VISTAMAXX™ and ENGAGE™ has a synergistic behavior in which PP domains are noticeably smaller and rounder. Such domains instead act as more of an impact-modifier, as opposed to contamination. These small, spherical domains enable the absorption of impact energy instead of cracking due to incompatibility. These materials come in pellet form and can be either compounded or dry-blended into a HDPE or PP post-consumer recycle batch at the supplier/compounding facility or at the molder just prior to the fabrication of the final part.

All samples below were prepared using extensive roll milling in order to mix the material, compression molding, and then die cutting to create samples to test. This method was mainly used to reduce the risk of damage to any equipment due to unknown contamination (rocks, PET, films, and copper wire was found during roll milling).

HDPE Study

Figure 1:
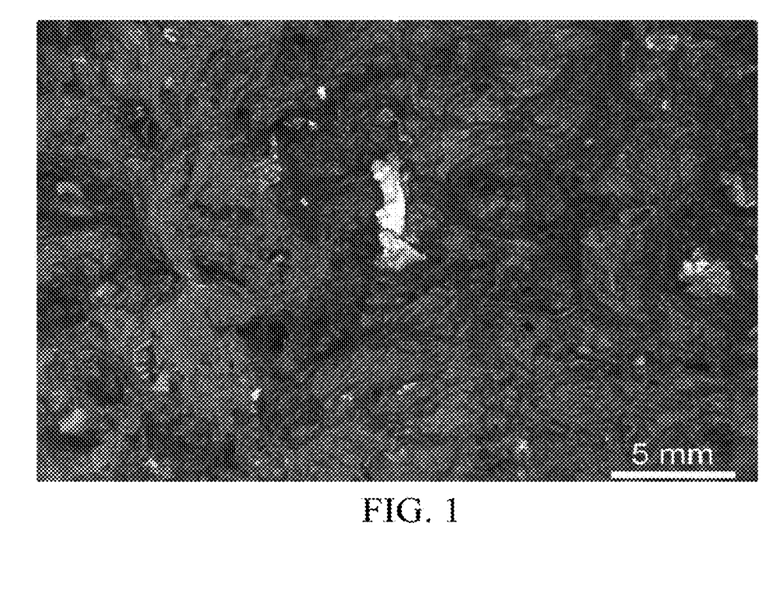
FIG. 1 is a microscope image of a composition, according to one embodiment.

This study was conducted to test a possible increase in the melt flow and impact resistance (FIG. 1). This material was a 3 MFR material obtained from a commercial source that appeared to have a lot of contamination. A polyethylene terephthalate powder as a filler is sometimes added to this material, which greatly decreases the properties. On the right is a picture of the contamination in the material after roll-milling. The given specs were as follows: 1) >60% PE; 2) <30% PP; 3) <5% etc. other polymers; 4) <5% mineral fillers; 5) <3% "other".

Figure 2:
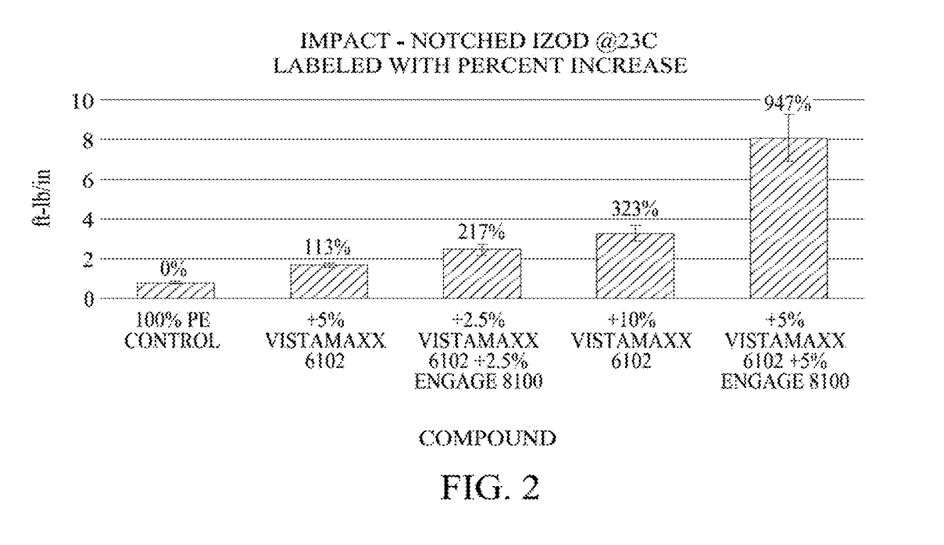
FIG. 2 is a graph illustrating notched Izod properties of compositions, according to one embodiment.

The synergistic trend using the composition is shown in FIG. 2. Percent increase in notched Izod results are shown as a percent above each bar. In comparison to the 100% PE control for instance, or using 5% to 10% VISTAMAXX™, or even using a mixture of 2.5% VISTAMAXX™ 6102 and 2.5% ENGAGE™ 8100, the 5% VISTAMAXX™ 6102 and 5% ENGAGE™ 8100 composition provides an increase of the physical properties. Overall, the 5% VISTAMAXX™ 6102 and 5% ENGAGE™ 8100 composition gives the best results and provides a tensile (Young's) Modulus value of 659 MPa, a tensile strength (about 0.28 MPa), an impact Notched Izod at 23° C. (about 8 ft-lb/in), an impact Unnotched Izod at 23° C. (about 15 ft-lb/in), and an impact Unnotched Izod at −40° C. (about 3.4 ft-lb/in).

Figure 3:
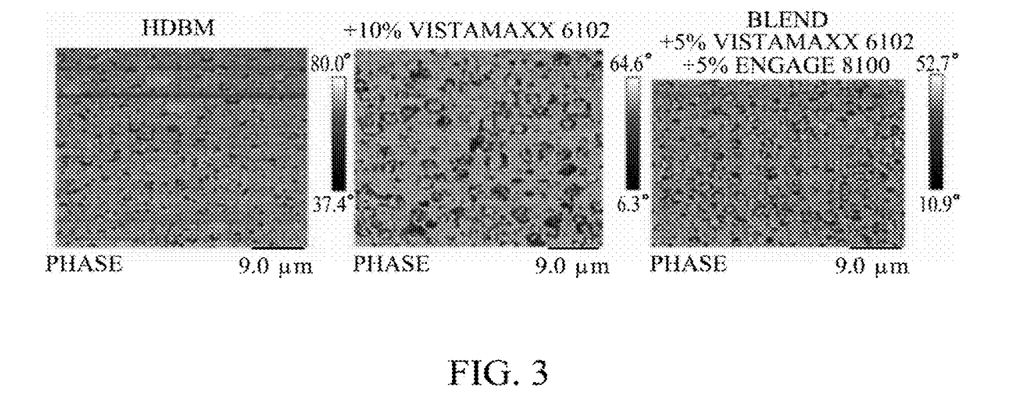
FIG. 3 is atomic force microscope images of compositions, according to one embodiment.

An additional HDPE (fractional melt ~0.6) grade material was tested with VISTAMAXX™ 6102 and VISTAMAXX™ 3020, as well as comparative materials. FIG. 3 illustrates the AFM results showing that VISTAMAXX™ polymers help with the dispersion of PP inside the PE matrix, as well as creating rounder domains and surrounding the PP, which helps with impact resistance. This particular material contains ~17.6% PP and ~81.7% PE, which was measured by $^{13}C$ NMR. The composition has an even better dispersion of domains of contamination, which is like an impact modified material.

Figure 4:
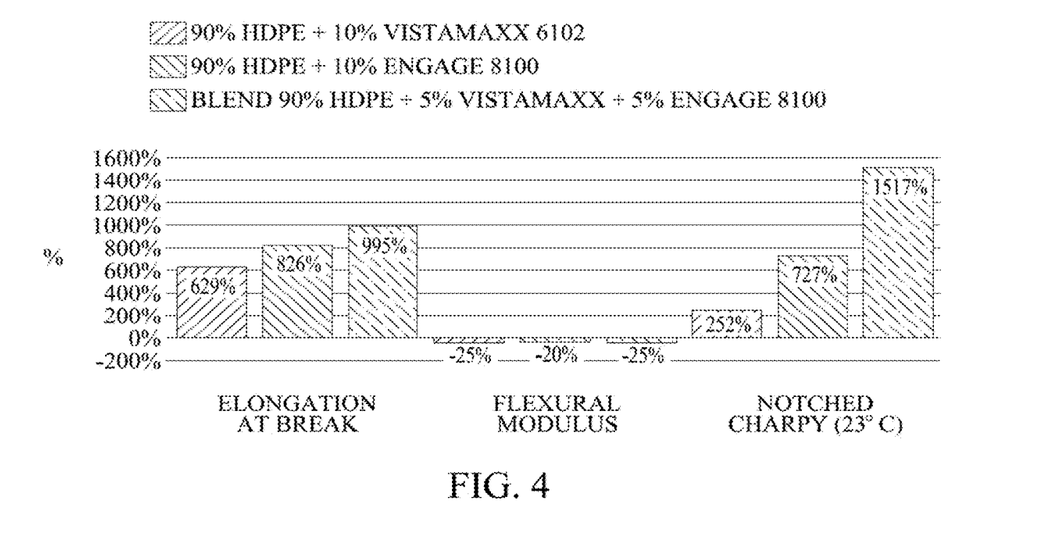
FIG. 4 is a graph illustrating overall flexural, tensile and impact data of compositions, according to one embodiment.

FIG. 4 illustrates the overall flexural and impact data using (1) a composition having 90% HDPE, 5% VISTAMAXX™ 6102 and 5% ENGAGE™ 8100, (2) a composition having 90% HDPE, 5% VISTAMAXX™ 6102 and 5% ENGAGE™ 8100. As shown in FIG. 4, the composition having 5% VISTAMAXX™ 6102 and 5% ENGAGE™ 8100 provides the highest value of impact Notched Charpy at 23° C. of 37.909 $kJ/m^2$ as well as the highest value of elongation at break.

Overall, it was observed that composition properties can be enhanced for both polypropylene and polyethylene-rich PCR materials. In an HDPE-rich material, for example, the VISTAMAXX™ has the tendency to surround the PP domains to help increase physical properties. Furthermore, the unique blend of VISTAMAXX™ and ENGAGE™ (50/50) was shown to further modify the HDPE-rich PCR, which resulted in very high impact strength. In the HDPE-rich PCR material blend having the VISTAMAXX™ and ENGAGE™ has a synergistic behavior in which PP domains are noticeably smaller and rounder. These domains instead act as more of an impact-modifier, as opposed to contamination.

Overall, compositions and methods of the present disclosure can provide compositions comprising a propylene-based elastomer and ethylene-based plastomer to provide enhanced composition properties such as flow modification and impact properties.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A polyolefin composition comprising:
   an ethylene polymer;
   a propylene polymer;
   from about 1 wt % to about 7 wt % of a propylene-based elastomer, based on the total weight of the polyolefin composition; and
   from about 1 wt % to about 7 wt % of an ethylene-based plastomer, based on the total weight of the polyolefin composition.

2. The polyolefin composition of claim 1, wherein the polyolefin composition comprises:
   from 70 wt % to 90 wt % of the propylene polymer and the ethylene polymer, combined, based on the total weight of the polyolefin composition;
   from 2 wt % to 5 wt % of the propylene-based elastomer based on the total weight of the polyolefin composition, and
   from 2 wt % to 5 wt % of the ethylene-based plastomer, based on the total weight of the polyolefin composition.

3. The polyolefin composition of claim 1, wherein a ratio (by weight) of the propylene-based elastomer to the ethylene-based plastomer is from 60:40 to 30:70.

4. The polyolefin composition of claim 1, wherein a ratio (by weight) of the ethylene polymer to the propylene polymer is from 90:10 to 10:90.

5. The polyolefin composition of claim 1, wherein the composition has a Notched Charpy impact strength at 23° C. of 8 kJ/m$^2$ or greater.

6. The polyolefin composition of claim 1, wherein the composition has a Notched Izod Impact Strength at 23° C. of 6 ft-lb/in. or greater.

7. The polyolefin composition of claim 1, wherein a portion of the composition has a submicron domain content of 50% or greater per mm$^2$.

8. The polyolefin composition of claim 1, wherein a portion of the composition has a submicron domain content of 90% or greater per mm$^2$.

9. The polyolefin composition of claim 1, wherein the ethylene polymer has an alpha-olefin comonomer content greater than 5 wt % and a density in the range of 0.916 g/cm$^3$ to 0.950 g/cm$^3$.

10. The polyolefin composition of claim 9, wherein the alpha-olefin comonomer is a $C_6$ to $C_{12}$ olefin.

11. The polyolefin composition of claim 1, wherein the ethylene polymer is an ethylene/propylene copolymer, an ethylene/butene copolymer, an ethylene/hexene copolymer, an ethylene/octene copolymer, an ethylene/alpha-olefin/diene terpolymer, or combinations thereof.

12. The polyolefin composition of claim 1, wherein the propylene polymer is selected from a random copolymer polypropylene, an impact copolymer polypropylene, an isotactic polypropylene, a syndiotactic polypropylene, a polypropylene homopolymer, and combinations thereof.

13. The polyolefin composition of claim 1, wherein the propylene polymer has an alpha-olefin selected from ethylene, 1-butene, 1-pentene, 1-hexene, 1-heptene, 1-octene, 1-nonene, 1-decene, 1-unidecene, 1-dodecene, 4-methyl-1-pentene, 4-methyl-1-hexene, 5-methyl-1-hexene, vinylcyclohexene, and styrene.

14. The polyolefin composition of claim 1, wherein the propylene polymer has a comonomer content within the range from 5 wt % to 35 wt %, based on a total weight of the propylene polymer.

15. The polyolefin composition of claim 1, wherein the propylene polymer has a melt flow rate of 50 or less g/10 min.

16. The polyolefin composition of claim 1, wherein the propylene polymer has a heat of fusion of from 1 J/g to 75 J/g.

17. The polyolefin composition of claim 1, wherein the propylene-based elastomer a propylene content of about 70 wt % or greater.

18. The polyolefin composition of claim 1, wherein the propylene-based elastomer has a $C_4$-$C_{10}$ comonomer content of from 8 wt % to about 25 wt %.

19. The polyolefin composition of claim 1, wherein the propylene-based elastomer has a triad tacticity of at least 75%.

20. The polyolefin composition of claim 1, wherein the propylene-based elastomer has a heat of fusion of about 80 J/g or less.

21. The polyolefin composition of claim 1, wherein the propylene-based elastomer has a Tm of about 110° C. or less.

22. The polyolefin composition of claim 1, wherein the propylene-based elastomer has a density of about 0.850 g/cm$^3$ to about 0.900 g/cm$^3$.

23. The polyolefin composition of claim 1, wherein the propylene-based elastomer has a melt flow rate of from 2 g/10 min to about 50 g/10 min.

24. The polyolefin composition of claim 1, wherein the propylene-based elastomer has an Elongation at Break of about 800% or less.

25. The polyolefin composition of claim 1, wherein the propylene-based elastomer has a weight average molecular weight of 50,000 g/mol to 400,000 g/mol.

26. The polyolefin composition of claim 1, wherein the propylene-based elastomer has a molecular weight distribution of 1.5 to about 5.

27. The polyolefin composition of claim 1, wherein the propylene-based elastomer has a temperature tensile elasticity of 1,000 megapascals (MPa) or less, as determined at 23° C.

28. The polyolefin composition of claim 1, wherein the ethylene-based plastomer has a $C_4$-$C_{10}$ comonomer content of from about 15 wt % to about 35 wt %, based on total weight of the ethylene-based plastomer.

29. The polyolefin composition of claim 1, wherein the ethylene-based plastomer has a density of 0.91 g/cm$^3$ or less.

30. The polyolefin composition of claim 1, wherein the ethylene-based plastomer has a heat of fusion of 90 J/g or less.

31. The polyolefin composition of claim 1, wherein the ethylene-based plastomer has a crystallinity of 40% or less.

32. The polyolefin composition of claim 1, wherein the ethylene-based plastomer has a melting point (Tm, peak first melt) of 100° C. or less.

33. The polyolefin composition of claim 1, wherein the ethylene-based plastomer has a glass transition temperature ($T_g$) of −20° C. or less.

34. The polyolefin composition of claim 1, wherein the ethylene-based plastomer has a melt index (MI, 2.16 kg at 190° C.) of 0.5 to 40 g/10 min.

35. The polyolefin composition of claim 1, wherein at least one of the ethylene polymer and the propylene polymer is a post-consumer recycle material.

\* \* \* \* \*